(12) United States Patent
Wigren (10) Patent No.: US 9,097,786 B2
(45) Date of Patent: Aug. 4, 2015

(54) REPORTING OF POSITIONING DATA

(75) Inventor: Karl Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 952 days.

(21) Appl. No.: 13/140,250

(22) PCT Filed: May 8, 2009

(86) PCT No.: PCT/EP2009/055615
§ 371 (c)(1),
(2), (4) Date: Jun. 16, 2011

(87) PCT Pub. No.: WO2010/069614
PCT Pub. Date: Jun. 24, 2010

(65) Prior Publication Data
US 2011/0244885 A1    Oct. 6, 2011

Related U.S. Application Data

(60) Provisional application No. 61/138,252, filed on Dec. 17, 2008.

(51) Int. Cl.
*G01S 5/02*    (2010.01)
*G01S 5/00*    (2006.01)
*G06T 17/05*   (2011.01)

(52) U.S. Cl.
CPC ............. *G01S 5/0252* (2013.01); *G01S 5/0009* (2013.01); *G06T 17/05* (2013.01)

(58) Field of Classification Search
CPC ......... G01S 5/009; G01S 5/14; G01S 5/0252; G01S 5/10; G01S 5/0018; G01S 5/0027; G01S 5/0257; G01S 19/25; G01S 19/51; H04W 64/00; H04W 4/02; H04W 24/02; H04L 67/18; G01C 21/28; G06T 17/05
USPC ............... 455/456.1–456.6, 422.1, 404.2; 342/357, 450–451, 462
See application file for complete search history.

(56) References Cited

U.S. PATENT DOCUMENTS

| 2004/0203856 A1 | 10/2004 | Wigren et al. |
| 2007/0275734 A1* | 11/2007 | Gaal et al. ................. 455/456.6 |
| 2008/0039114 A1 | 2/2008 | Phatak et al. |

FOREIGN PATENT DOCUMENTS

| EP | 1193994 A1 | 4/2002 |
| WO | 2007/043915 A1 | 4/2007 |
| WO | 2008/054271 A1 | 5/2008 |
| WO | 2008/127159 A1 | 10/2008 |
| WO | WO 2008127159 A1 * | 10/2008 |

OTHER PUBLICATIONS

T. Wigren, "Adaptive enhanced cell-ID fingerprinting localization by clustering of precise position measurements", IEEE Trans. Veh. Tech., vol. 56, No. 5, pp. 3199-3209, 2007.*
3GPP TS 23.032, release 6 (v6.0.0), Universal Geographical Area Description (GAD), Dec. 2004—Not provided due to export protections on file but available online. Available: http://www.3gpp.org/ftp/Specs/html-info/23032.htm.*

* cited by examiner

*Primary Examiner* — George Eng
*Assistant Examiner* — Umair Ahsan
(74) *Attorney, Agent, or Firm* — Coats & Bennett, PLLC (57) ABSTRACT

A method for reporting of positioning data in a communication network comprises obtaining (202) of positioning data comprising a definition of a polygon in a lateral plane with information of altitude associated to each polygon corner. The method further comprises approximating (204) the polygon with an ellipsoid point having altitude and uncertainty ellipsoid and reporting (206) of the ellipsoid point having altitude and uncertainty ellipsoid over an interface of the communication network as a representation of the positioning data. A node in a communication network comprises a report converter arranged for obtaining positioning data and approximating a polygon with an ellipsoid point having altitude and uncertainty ellipsoid.

16 Claims, 6 Drawing Sheets

| | 8 | 7 | 6 | 5 | 4 | 3 | 2 | 1 | |
|---|---|---|---|---|---|---|---|---|---|
| | 0 | 1 | 0 | 1 | \multicolumn{4}{c|}{NO. OF POINTS} | OCTET 1 |
| | S1 | \multicolumn{7}{c|}{LATITUDE POINT 1} | OCTET 2 |
| | | | | | | | | | OCTET 3 |
| | | | | | | | | | OCTET 4 |
| | \multicolumn{8}{c|}{LONGITUDE POINT 1} | OCTET 5 |
| | | | | | | | | | OCTET 6 |
| | | | | | | | | | OCTET 7 |

⋮

| | Sn | LATITUDE POINT n | OCTET 6n-4 |
|---|---|---|---|
| | | | OCTET 6n-3 |
| | | | OCTET 6n-2 |
| | LONGITUDE POINT n | | OCTET 6n-1 |
| | | | OCTET 6n |
| | | | OCTET 6n+1 |

Fig. 2
(Prior Art)

| 8 | 7 | 6 | 5 | 4 | 3 | 2 | 1 | |
|---|---|---|---|---|---|---|---|---|
| 1 | 0 | 0 | 1 | | | | | OCTET 1 |
| S | LATITUDE | | | | | | | OCTET 2 |
| | | | | | | | | OCTET 3 |
| | | | | | | | | OCTET 4 |
| LONGITUDE | | | | | | | | OCTET 5 |
| | | | | | | | | OCTET 6 |
| | | | | | | | | OCTET 7 |
| D | ALTITUDE | | | | | | | OCTET 8 |
| | | | | | | | | OCTET 9 |
| | UNCERT. SEMI-MAJOR | | | | | | | OCTET 10 |
| | UNCERT. SEMI-MINOR | | | | | | | OCTET 11 |
| ORIENTATION OF MAJOR AXIS | | | | | | | | OCTET 12 |
| | UNCERT. ALTITUDE | | | | | | | OCTET 13 |
| | CONFIDENCE | | | | | | | OCTET 14 |

Fig. 4

(Prior Art)

REPORTING OF POSITIONING DATA

TECHNICAL FIELD

The present invention relates in general to positioning or location based services in different network architectures.

BACKGROUND

There is a need for being able to determine the position of a mobile terminal within a wireless communication system as accurately as possible. One successful approach is based on a fingerprinting approach; Adaptive Enhanced Cell ID (AECID) fingerprinting. Some basics of such a method can be found in the published international patent application WO 2007/043915. The output positioning data from such a system is typically provided as an area defined by a polygon. In the 3GPP standards, there is a possibility to report such polygons using a polygon message IE.

However, in many applications, it is also of interest to not only determine the lateral position, but also the altitude of the mobile terminal. The addition of altitude information is important e.g. in metropolitan areas with tall buildings, where the cell planning may be 3 dimensional. Then emergency positioning would benefit significantly by an altitude providing positioning fallback method to A-GPS. In such a case, an area associated with a position of a mobile terminal easily can be expressed by a polygon enhanced with altitude information of the polygon corners. A problem is, however, that there are no standardized formats for handling such types of information.

Reporting of altitude of polygon corners has been addressed by non-standard compliant means in the published international patent application WO 2008/054271. However, such solution requires that the involved nodes on both sides of a communication are updated concerning such non-standard solutions, a procedure which is both expensive and time consuming.

SUMMARY

An object of the present invention is to provide methods and devices that allows for reporting of information based on a polygon enhanced with altitude information utilizing standard compliant means. The above object is achieved by methods and arrangements according to the enclosed independent patent claims. Different preferred embodiments are achieved by methods and arrangements according to the enclosed dependent patent claims. In general words, according to a first aspect, a method for reporting of positioning data in a communication network comprises obtaining of positioning data comprising a definition of a polygon in a lateral plane with information of altitude associated to each polygon corner. The method further comprises approximating the polygon with an ellipsoid point having altitude and uncertainty ellipsoid and reporting of the ellipsoid point having altitude and uncertainty ellipsoid over an interface of the communication network as a representation of the positioning data.

In a second aspect, a node in a communication network comprises a report converter arranged for obtaining positioning data comprising a definition of a polygon in a lateral plane with information of altitude associated to each polygon corner. The report converter is further arranged for approximating the polygon with an ellipsoid point having altitude and uncertainty ellipsoid. The node further comprises a report unit connected to the report converter and to an interface of the communication network. The report unit is arranged for reporting the ellipsoid point having altitude and uncertainty ellipsoid over the interface as a representation of the positioning data.

One advantage with the present invention is that only the reporting node has to be updated with new functionality. The receiving side is not affected. Another advantage with the present invention is that altitude information achieved e.g. by AECID can be utilized for positioning of user equipment that itself do not have any altitude measuring means.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

AECID is a fingerprinting positioning technology that refines the basic fingerprinting methods in a variety of ways. A first recent published international patent application WO 2007/043915 discloses the main ideas of the invention. The AECID gives rise to position determination assisting data constituted by an area definition in the shape of a polygon.

Figure 1:
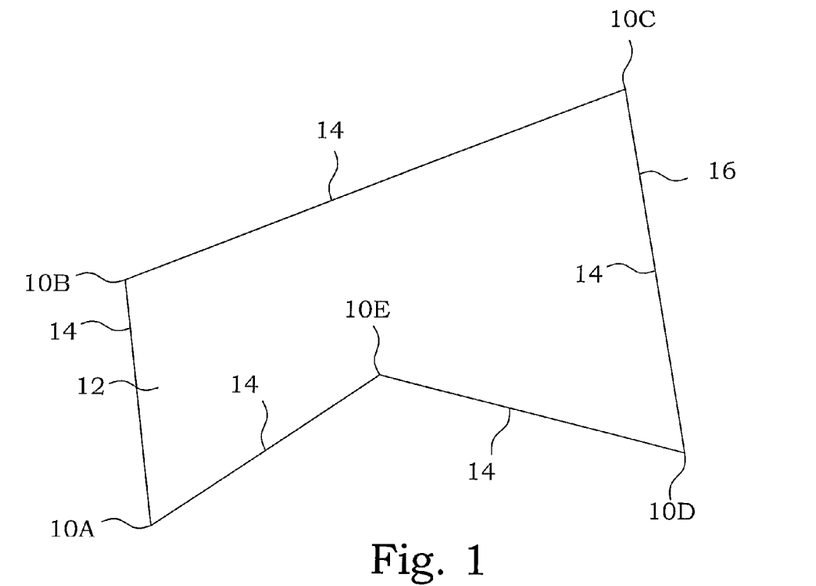
FIG. 1 illustrates a polygon.

The polygon format exploited by the basic two-dimensional AECID method is best described by FIG. 1. An area 12 is defined by a number of sides 14 of a polygon 16. The polygon is entirely defined by defining positions of a number of polygon corners 10A-E together with information how the polygon corners are connected. In order to fit into standard reporting formats, the selected number of polygon corners 10A-E must be between 3 and 15. The polygon 16 is not allowed to intersect itself. A special case of the latter conditions is that all polygon corners 10A-E need to be different.

Figure 2:
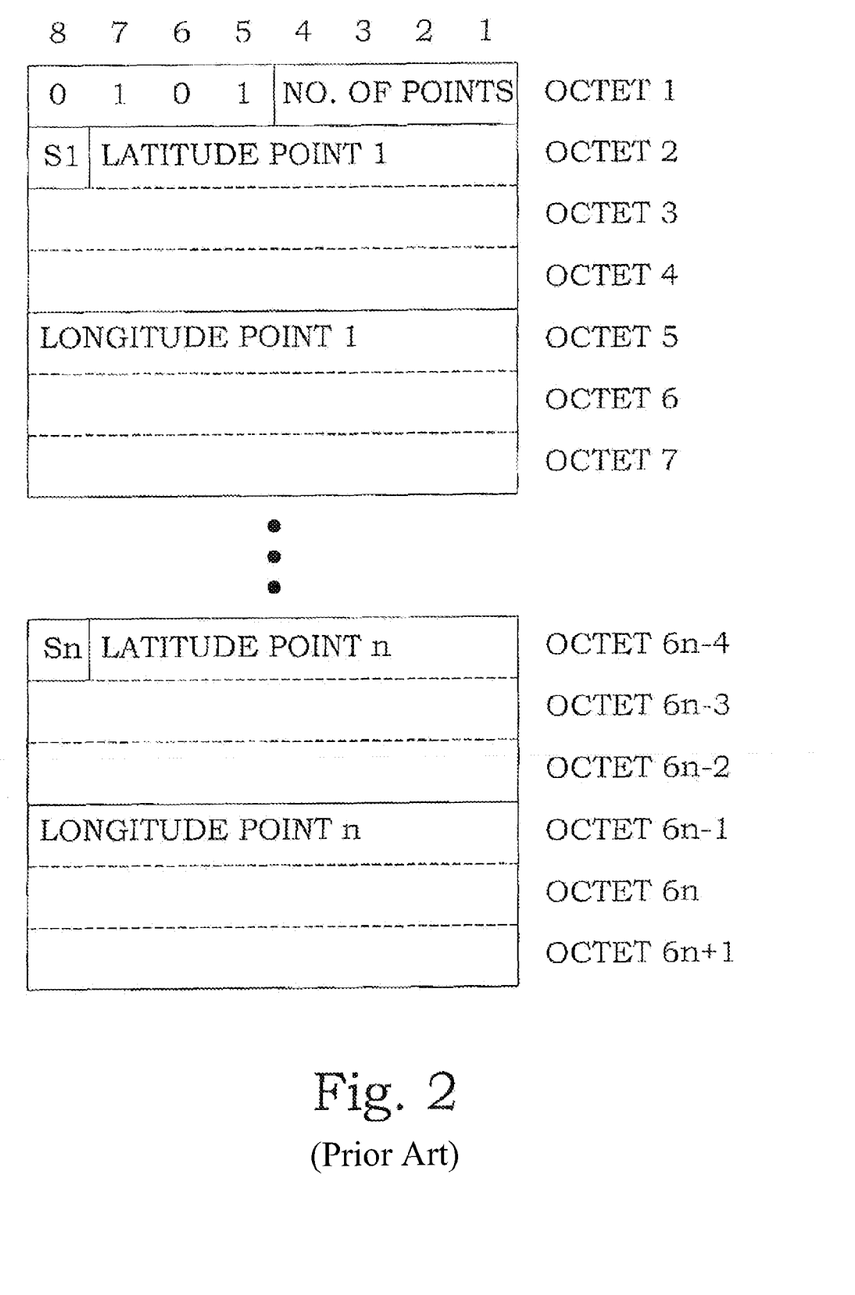
FIG. 2 illustrates a polygon reporting format.

FIG. 2 illustrates the 3GPP Polygon message IE (Information Element). This IE is present in the LOCATION REPORT message that is returned to the core network over the RANAP interface e.g. after a successful cell identity positioning. A polygon obtained by a standard two-dimensional AECID procedure can thus easily be reported using this standard polygon message.

However, the polygon can also be complemented by altitude information associated to each polygon corner. As mentioned before, the addition of altitude information is important e.g. in metropolitan areas with tall buildings, where the cell planning may be 3 dimensional. The addition of altitude to the corners of the polygon as achieved by e.g. AECID is straightforward. It is obtained by the following two steps. In the first step, for each corner, a predetermined number of reference points of the underlying cluster are determined. These reference points are the reference points closest to the corner. In the second step, for each polygon corner, the average of the altitudes of the closest reference points are used as an estimate of the altitude of the polygon corner.

The addition of the altitude parameter in the area description from AECID also gives terminals without altitude measurement capability, e.g. without A-GPS or without barometric altimeters, a possibility to be positioned also in altitude, by using the AECID position determination assisting data.

The addition of altitude information, however, gives rise to some problems. The positioning functionality for cellular systems known in prior art does not allow standard compliant reporting of altitude information, when the horizontal data is provided as a polygon. The consequence is that altitude information cannot be provided to the end user in case of fallback emergency positioning. Also, terminals without altitude measurement capability, e.g. without A-GPS or without barometric altimeters, cannot be provided with altitude information.

It is known that in a 2-dimensional case, most polygon definitions obtained by AECID are fairly well represented by an ellipsoidal shape. A polygon can thus be approximated by an ellipse.

One way to obtain a 2-dimensional ellipse from a polygon would be to first compute the covariance matrix in 2 dimensions, using the coordinates of the polygon corners. An eigenvalue analysis then gives the minor axis, the major axis and the angle with respect to north of the major axis. The main drawback is that scaling properties are not completely preserved since the confidence value of the polygon is not used to constrain the size of the computed polygon.

Another way to obtain a 2-dimensional ellipse from a polygon would be to use optimization. This solution is disclosed in the published international patent application WO2008/127159. Such solutions are, however, not compatible with position determination assisting data having associated altitudes.

Figure 3:
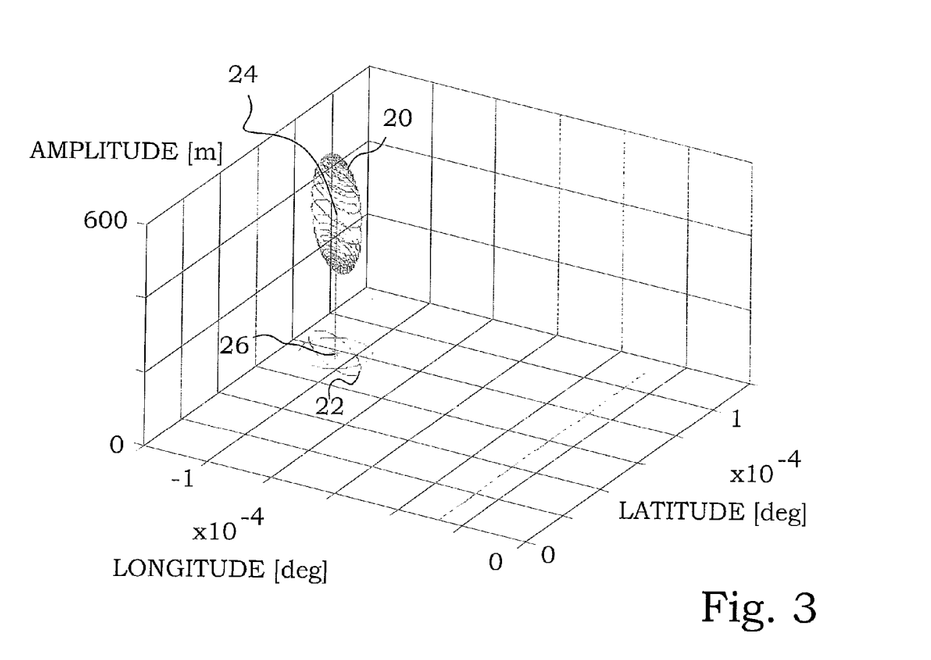
FIG. 3 illustrates an ellipsoid point with an uncertainty ellipsoid.

The present invention is based on another conversion. In this case a geographical shape conversion from polygons with altitude information to ellipsoid point with altitude and uncertainty ellipsoid is used. An ellipsoid point with altitude and uncertainty ellipsoid is compatible with 3GPP formats. Such a geometric shape is illustrated in FIG. 3. An ellipsoid point 24 is encircled by an uncertainty ellipsoid 20. A projection point 26 of the ellipsoid point 24 onto a plane with zero height is illustrated and also a projection ellipse 22 corresponding to the uncertainty ellipsoid 20.

Figure 4:
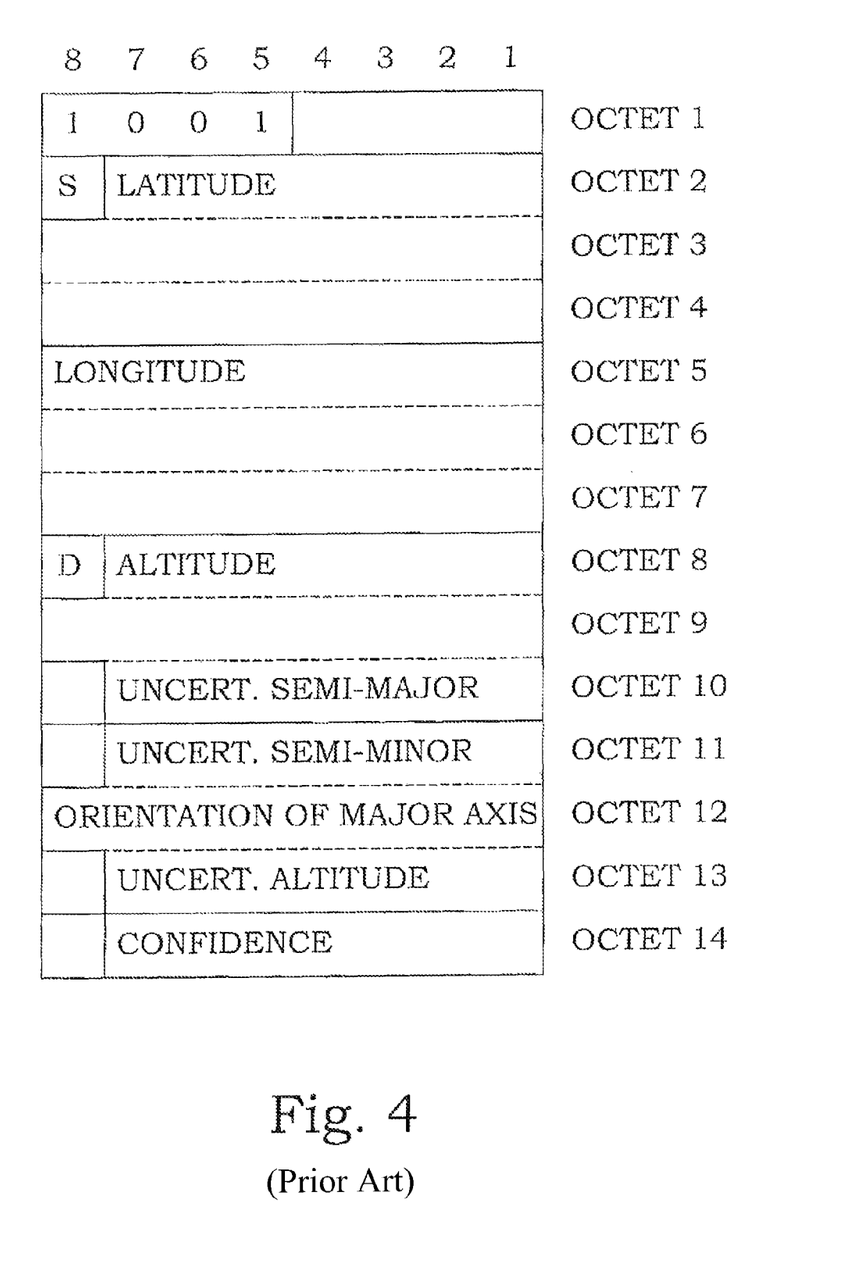
FIG. 4 illustrates a reporting format for an ellipsoid point with an uncertainty ellipsoid.

This format is prepared for within the 3GPP formats. FIG. 4 illustrates a 3GPP Ellipsoid Point with Altitude and Uncertainty Ellipsoid message IE (Information Element). This IE is present in the LOCATION REPORT message that is returned to the core network over the RANAP interface e.g. after a successful A-GPS positioning.

The present invention introduces novel features in the reporting chain of polygons with altitude information. This is schematically displayed in FIG. 5. A first node 30, in a wireless communication system 1 communicates with a second node 40. The first node is typically an RNC 32 and the second node is typically a MSC 42. The communication takes place over a communication interface 2, in this case a 3GPP interface 3. The first node comprises positioning unit 34 creating positioning data, typically arranged with an AECID arrangement, giving an output 38 comprising a polygon and altitudes for each polygon corner. A report converter 36 is arranged for obtaining the positioning data comprising a definition of a polygon in a lateral plane with information of altitude associated to each polygon corner and approximating the polygon with an ellipsoid point having altitude and uncertainty ellipsoid. The output 39 from the report converter 36 thereby comprises a definition of the ellipsoid point having altitude and uncertainty ellipsoid. This output 39 is supplied to a report unit 37, connected to the report converter 36 and to the communication interface 2. The report unit 37 is arranged for reporting the ellipsoid point having altitude and uncertainty ellipsoid over the interface as a representation of the positioning data.

Figure 5:
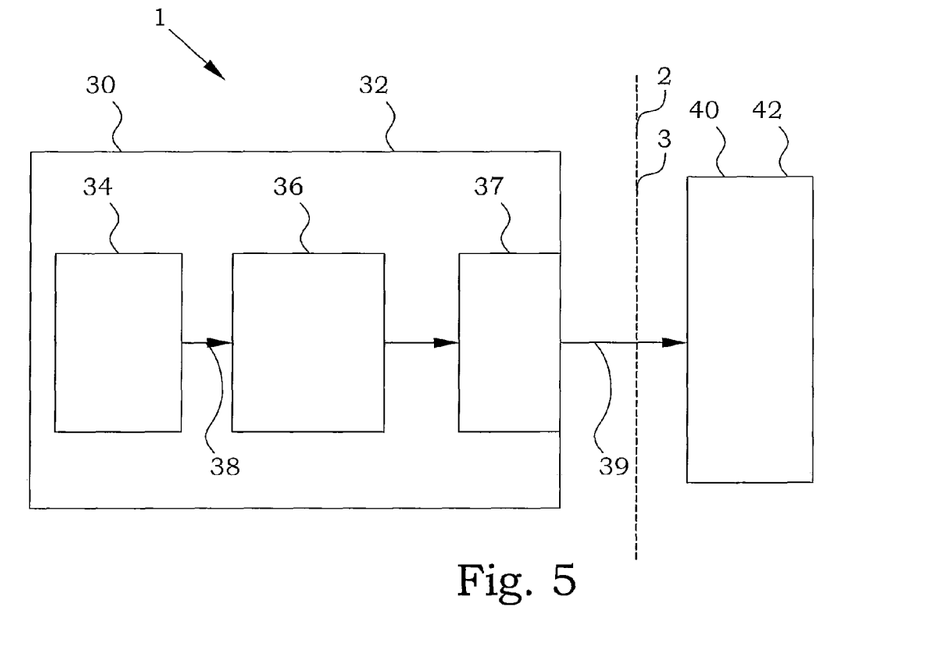
FIG. 5 illustrates communication between nodes in a communication network according to an embodiment of the present invention.

The transmission over the 3GPP interface 3 of the area information or positioning data, originally computed as a polygon 38 with associated corner altitudes is thus performed in the shape of an ellipsoid point 39 with altitude and uncertainty ellipsoid. In the present embodiment, the conversion is made in the same node as provides the polygon with altitude. However, the positioning unit 34 may alternatively be provided in another node connected to the node in which the report converter 36 is provided. The report converter 36 is then connected to a receiver, which receiver is arranged for receiving the positioning data from the external positioning unit 34.

At the receiving side, at the second node 40, no re-conversion is made. Instead, the area is assumed to be defined by the ellipsoid point with altitude and uncertainty ellipsoid. The node 30 responsible for providing the polygon 38 with altitude and the shape conversion is typically situated in the core network of the wireless communication system or in the RNC, while the receiving node 40 typically is another CN node, e.g. a MSC 42, since this type of information normally flows in that direction. However, also the opposite is possible.

Figure 6:
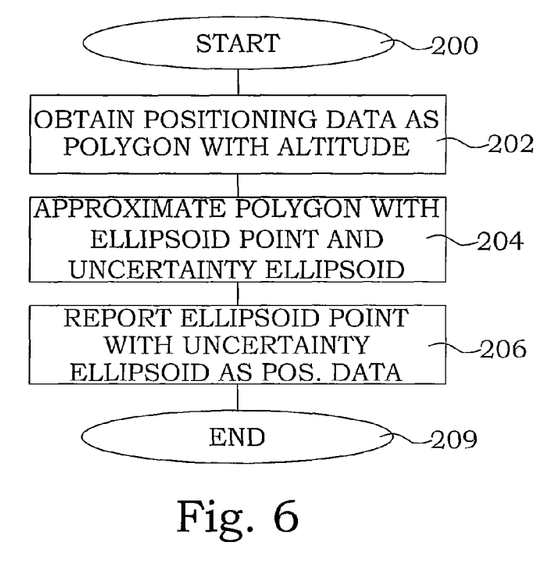
FIG. 6 is a flow diagram of steps of an embodiment of a method according to the present invention.

FIG. 6 illustrates a flow diagram of main steps of an embodiment of a method according to the present invention. The method for reporting of positioning data in a communication network starts in step 200. In step 202, positioning data comprising a definition of a polygon in a lateral plane with information of altitude associated to each polygon corner is obtained. The polygon is in step 204 approximated with an ellipsoid point having altitude and uncertainty ellipsoid. In step 206, the ellipsoid point having altitude and uncertainty ellipsoid is reported over an interface of the communication network as a representation of the positioning data. The method ends in step 209.

The shape conversion from polygon with altitude to ellipsoid point with altitude and uncertainty ellipsoid can be performed in different ways. However, in a preferred embodiment, the conversion is made as follows. First the two-dimensional polygon information is shape conversed into an ellipse. This is basically made according to the lines as reproduced in Appendix A.

Subsequently, addition of confidence preserving altitude information is made by extension of the 2D-method of Appendix A. When performing the addition of altitude information, it is essential to understand that the normal use of the uncertainty ellipsoid is for reporting of A-GPS results. This means that it is normally assumed that the complete shape defines an underlying Gaussian error model. For this reason it may be required to modify both the scaling of the 2D ellipse computed above, and the altitude uncertainty, to achieve a shape that is consistent with the Gaussian assumption—this is what will be assumed when using the reported result.

In a first step, the starting point for the construction of the ellipsoid point with altitude and uncertainty ellipsoid is to compute the ellipsoid point with altitude part. The ellipsoid point follows from (A3) and (A4) of Appendix A.

Here, a lateral centre of gravity of the polygon is calculated as lateral parameters of the ellipsoid point. The altitude of the point is then computed as the mean of the altitudes of the polygon corners, $$z_{CG} = \sum_{i=1}^{N_P} z_i. \quad (1)$$

Here $z_{CG}$ is the altitude of the ellipsoid point with altitude, being equal to the altitude center of gravity of the polygon corners. $z_i$ denote the altitudes of the polygon corners.

In a second step, to compute the uncertainty ellipsoid, based on a Gaussian assumption, the 3D covariance matrix corresponding to the polygon with altitude needs to be constructed. It is well known that the 2D principal axes of the covariance matrix correspond to the semi-major and semi-minor axes of the ellipse when a 38% (0.38) confidence $C_e$ is applied in the 2D algorithm described in Appendix A. A direction of a longest line segment through the centre of gravity with end points on a boundary of the polygon is searched for as an orientation of a major axis of the ellipsoid point. The covariance in the vertical direction is:

$$c^2 = \sum_{i=1}^{N_P} (z_i - z_{CG})^2. \quad (2)$$

TABLE 1

Scale factor as a function of the confidence.

| $C_{3D}$, | $\gamma$ |
|---|---|
| 0.0041 | 0.2512 |
| 0.0054 | 0.2746 |
| 0.0070 | 0.3002 |
| 0.0091 | 0.3282 |
| 0.0118 | 0.3588 |
| 0.0153 | 0.3922 |
| 0.0199 | 0.4288 |
| 0.0257 | 0.4688 |
| 0.0331 | 0.5125 |
| 0.0426 | 0.5603 |
| 0.0547 | 0.6125 |
| 0.0699 | 0.6696 |
| 0.0890 | 0.7320 |
| 0.1129 | 0.8003 |
| 0.1423 | 0.8749 |
| 0.1781 | 0.9564 |
| 0.2213 | 1.0456 |
| 0.2724 | 1.1430 |
| 0.3319 | 1.2496 |
| 0.3994 | 1.3661 |
| 0.4740 | 1.4935 |
| 0.5539 | 1.6327 |
| 0.6362 | 1.7849 |
| 0.7170 | 1.9513 |
| 0.7922 | 2.1332 |
| 0.8576 | 2.3321 |
| 0.9103 | 2.5495 |
| 0.9489 | 2.7872 |
| 0.9743 | 3.0470 |
| 0.9888 | 3.3310 |
| 0.9959 | 3.6416 |
| 0.9988 | 3.9811 |

In a third step, a scaling with a factor of $\gamma$ is applied to all axes of the covariance matrix in order to achieve the desired 3D confidence $C_{3D}$. The calculation of the uncertainty ellipsoid is thus based on a 3-dimensional covariance matrix of the polygon with altitude. Due to the Gaussian assumption, this means that the following equation needs to be fulfilled:

$$C_{3D} = \iiint_{\left(\frac{x}{\gamma a}\right)^2 + \left(\frac{x}{\gamma b}\right)^2 + \left(\frac{x}{\gamma c}\right)^2 \leq 1} \frac{1}{(2\pi)^{1.5} abc} e^{-\frac{1}{2}\left(\left(\frac{x}{a}\right)^2 + \left(\frac{x}{b}\right)^2 + \left(\frac{x}{c}\right)^2\right)} dx\,dy\,dz = \quad (3)$$

$$\text{erf}\left(\frac{\gamma}{2}\right) - \sqrt{\frac{2}{\pi}} \gamma\, e^{-\frac{\gamma^2}{2}}.$$

From this equation it is possible to numerically compute a table mapping $\gamma$ as a function of $C_{3D}$. Given a required $C_{3D}$, the scale factor $\gamma$ can be computed by a predetermined table look-up. An example of such a predetermined look-up table appears in Table 1.

In a fourth step, the new axes of the 3G ellipsoid are computed as:

$$a_{Scaled} = \gamma a \quad (4)$$

$$b_{Scaled} = \gamma b \quad (5)$$

$$c_{Scaled} = \gamma c \quad (6)$$

In a fifth step, the computed information is encoded, e.g. according to the 3GPP standard. This enables reporting of altitude over 3GPP interfaces.

Figure 7:
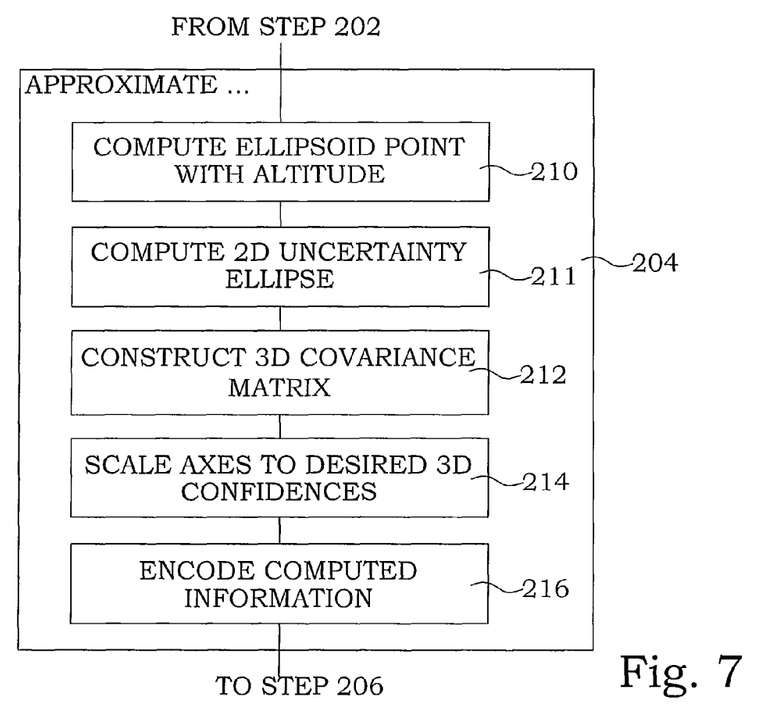
FIG. 7 is a flow diagram of preferred part steps of one of the steps of FIG. 6.

FIG. 7 summarizes the presently preferred embodiment of the approximating step 204 (FIG. 6). In step 210, the ellipsoid point with altitude part is computed. A lateral centre of gravity of the polygon is calculated as lateral parameters of the ellipsoid point and a mean of the altitudes associated to each polygon corner is calculated as altitude parameters of the ellipsoid point. Preferably, a search is performed, for a direction of a longest line segment through the centre of gravity with end points on a boundary of the polygon. This direction is selected as an orientation of a major axis of the ellipsoid point. In step 211, a 2D uncertainty ellipse is computed. This can be done with the method of the appendix A. In general words, sizes of the horizontal semi-major and semi-minor axes corresponding to confidence values associated with the confidence of the polygon are calculated in a lateral plane with information of altitude associated to each polygon corner. In order to compute the uncertainty ellipsoid based on a Gaussian assumption, the 3D covariance matrix corresponding to the polygon with altitude is constructed in step 212. In general words, a standard deviation of the altitude associated to each polygon corner in a lateral plane is calculated with information of altitude associated to each polygon corner. A scaling with a factor of $\gamma$ is in step 214 applied to all axes of the covariance matrix in order to achieve the desired 3D confidence $C_{3D}$. This is preferably performed by a table look-up. In step 216 the computed information is encoded, e.g. according to the 3GPP standard.

In particular, the invention relates to the fingerprinting positioning algorithm that is a part external positioning nodes for GSM, under consideration also for LTE and WCDMA. This fingerprinting algorithm has the ability to produce altitudes, of each of the corners of the polygons the algorithm computes. The invention provides means for transforming the polygon with altitudes to a point with altitude and uncertainty ellipsoid—a format that is available as a 3GPP standard format.

Service-wise it also provides an altimeter to terminals that are not equipped with A-GPS. The present invention makes it possible to provide altitude in addition to position, also to terminals that are not capable of measurement of altitude, e.g. terminals that are not A-GPS capable. The reporting problem is general in the sense that the 3GPP formats involved are used over RANAP, RNSAP, in the CN and in secure user plane localization (SUPL) for WCDMA, and probably for the corresponding LTE interfaces, when these are finalized in 3GPP R9.

The advantages of the invention are significant for cellular systems with a large number of non-A-GPS capable terminals—i.e. the majority of the present cellular networks. The addition of altitude information is important e.g. in urban metropolitan areas with tall buildings, where the cell planning is 3 dimensional. There emergency positioning would benefit by an altitude providing positioning fallback method to A-GPS. For commercial services the invention also provides an altimeter to terminals that are not equipped with A-GPS.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

ABBREVIATIONS

3GPP—Third Generation Partnership Project
AECID—Adaptive Enhanced Cell-ID
A-GPS—Assisted Global Positioning System
CN—Core Network
GSM—Global System for Mobile communications
IE—Information Element
LTE—Long-Term Evolution
MSC—Mobile Switching Center
RANAP—Radio Access Network Application Part
RNC—Radio Network Controller
RNSAP—Radio Network Subsystem Application Part
SUPL—Secure User Plane Localization
WCDMA—Wideband Code Division Multiple Access
Appendix A
Shape Conversion from Polygon to Ellipsoid Point with Uncertainty Ellipsoid The task in this part is to transform a confidence region described by the polygon format and a confidence value for the polygon, to a confidence region described by the ellipse format, and a (possibly different) confidence value for the ellipse. The ellipse does not carry altitude information since the polygon does not.

The polygon format is illustrated by FIG. 2. The polygon is defined by a list of 3-15 corners, in WGS 84 co-ordinates. No self-intersections are allowed. In the description that follows the corners are assumed to have been transformed to a local earth-tangential Cartesian co-ordinate system, with co-ordinate axes in the north and east directions.

Figure 8:
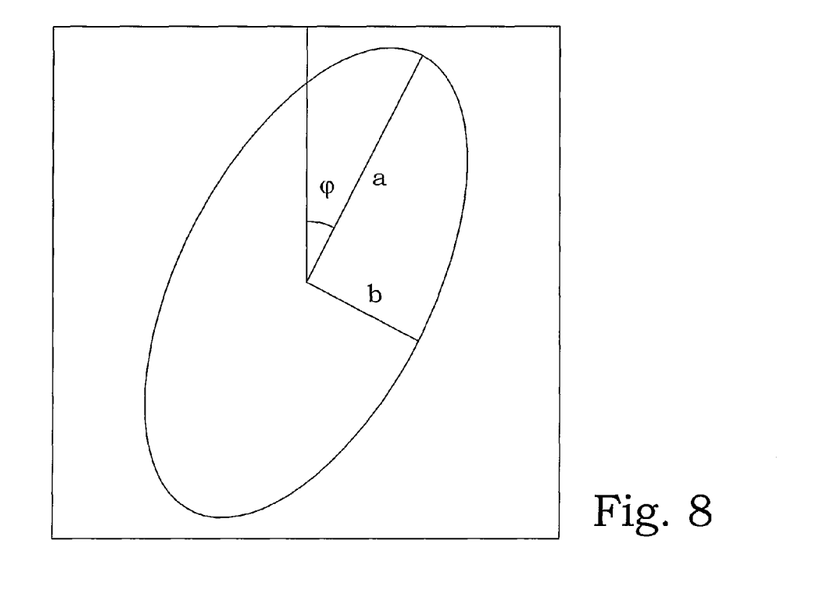
FIG. 8 illustrates a 2D uncertainty ellipse.

The ellipse, to which the polygon is to be transformed, can be described by FIG. 8. It is parameterized in terms if the semi-major axis, a, the semi-minor axis, b, and the angle, $\phi$, that is counted clockwise from north. Note that in the description that follows, $\phi$ is replaced by $\alpha = 90° - \phi$ in order to get a normally oriented coordinate system. If desired, back substitution in all formulas below can be used in case it is preferred to use $\phi$ instead of $\alpha$.

The transformation from polygon to ellipse is best described by a number of steps, starting with:
Step 1: Computation of the Area of the Polygon.

The computation is performed by a division of the polygon into non-overlapping triangles. This step is well known in prior art. The starting point is the corners of the polygon, expressed in a local earth tangential co-ordinate system, that are collected in the vector:

$$r_p = \begin{pmatrix} x_1 & \cdots & x_{N_p} \\ y_1 & \cdots & y_{N_p} \end{pmatrix}. \tag{A1}$$

The corresponding area is then:

$$A_p = \frac{1}{2} \sum_{i=1}^{N_p} x_i y_{[i]_{N_p}+1} - x_{[i]_{N_p}+1} y_i. \tag{A2}$$

In (A2), $[\ ]_{N_p}$ denotes the integer argument modulo the integer number of corners, Np.
Step 2: Computation of the Center of Gravity of the Polygon.

The center of gravity is denoted ($x_{CG}$ $y_{CG}$). Standard results, based on a division of the polygon into non-overlapping triangles, then show that:

$$x_{CG} = \frac{1}{6A_p} \sum_{i=1}^{N_p} \left( x_i y_{[i]_{N_p}+1} - x_{[i]_{N_p}+1} y_i \right)\left( x_i + x_{[i]_{N_p}+1} \right) \tag{A3}$$

$$y_{CG} = \frac{1}{6A_p} \sum_{i=1}^{N_p} \left( x_i y_{[i]_{N_p}+1} - x_{[i]_{N_p}+1} y_i \right)\left( y_i + y_{[i]_{N_p}+1} \right). \tag{A4}$$

Step 3: Search for the Longest Line Segment, Through the Center of Gravity, with End Points on Polygon Boundary.

This step determines the orientation of the semi-major axis, in terms of the angle $\alpha$. The idea is to search over a discretized set of lines that all pass through the center of gravity, in order to find the line with the longest line segment with end points on the boundary of the polygon. This search is performed by:

Selection of a number of angles, defining the slopes of the lines passing through the center of gravity of the polygon.

Determination of the intersections between one of said lines passing through the center of gravity of the polygon and all line segments forming the sides of the polygon, repeated for all lines passing through the center of gravity of the polygon.

Determination of which of line segments passing through the center of gravity and ending on the boundary of the polygon, that is longest.

Selection of the angle $\alpha$ as the angle generating said line segment that is longest.

Figure 9:
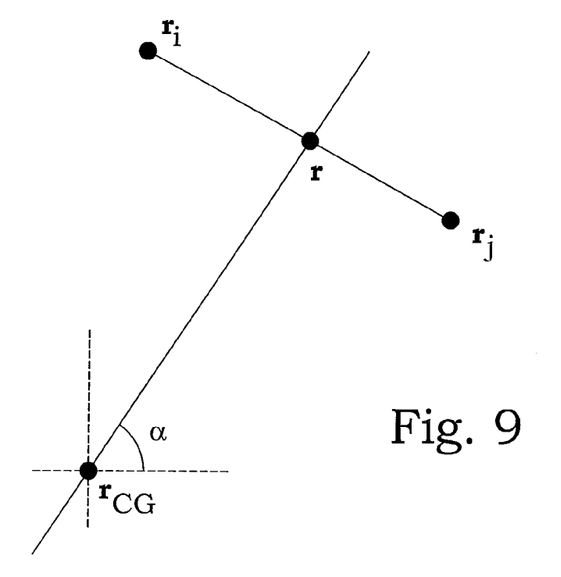
FIG. 9 illustrates a geometry used for determination of $\alpha$.

Mathematically, the above steps can be formulated from FIG. 9. It follows that:

$$r = r_{CG} + \beta \begin{pmatrix} \cos(\alpha) \\ \sin(\alpha) \end{pmatrix} \tag{A5}$$

$$r = r_i + \delta(r_j - r_i) \tag{A6}$$

where $\beta$ and $\delta$ are scalar parameters. The solution to the system of equations defined by (A5) and (A6) follows as:

$$\begin{pmatrix} \beta \\ \delta \end{pmatrix} = \begin{pmatrix} \cos(\alpha) & r_i^x - r_j^x \\ \sin(\alpha) & r_i^y - r_j^y \end{pmatrix}^{-1} \begin{pmatrix} r_i^x - x_{CG} \\ r_i^y - y_{CG} \end{pmatrix}. \quad (A7)$$

The superscripts $^x$ and $^y$ denote the x- and y-component of a vector, respectively. For a given $\alpha$, and a pair of corner points of the polygon ($r_i$ and $r_j$), the parameters $\beta$ and $\delta$ are determined. Obviously, in case $\delta \in [0,1]$ then the intersection falls between said corner points and is valid, otherwise it is discarded. The calculation of $\beta$ and $\delta$ are repeated for all line segments of the boundary of the polygon. Since the direction vector is of the line through the center of gravity is normalized, it follows that the length of the line segment between the center of gravity and the boundary is given by the corresponding $\beta$. The intersections that generate the largest difference:

$$l(\alpha) = \beta_k - \beta_l \quad (A8)$$

hence correspond to the sought candidate length for the angle $\alpha$. Finally, the angle $\alpha$ that renders the largest value of $l(\alpha)$ is determined, i.e.:

$$\alpha_e \operatorname{argmax}_\alpha l(\alpha) = 90° - \varphi. \quad (A9)$$

This value of $\alpha$ determines the orientation of the semi-major axis. The lengths of the semi-major and semi-minor axes are determined in a subsequent optimization step.

Step 4: Translation and Rotation of the Polygon.

As a preparation for the subsequent optimization step, the polygon corners are transformed so that the center of gravity of the polygon is moved to the origin of the co-ordinate system and so the orientation of the semi-major axis coincides with the x-axis. This is achieved by the transformations:

$$r'_p = r_p - r_{CG} \quad (A10)$$

$$r''_p = \begin{pmatrix} \cos(\alpha_e) & \sin(\alpha_e) \\ -\sin(\alpha_e) & \cos(\alpha_e) \end{pmatrix} r'_p. \quad (A11)$$

The latter transformation performs a rotation an angle $-\alpha_e$.

Step 5: Optimization of Semi-Major and Semi-Minor Axes Against Polygon Boundary.

In order to explain this step, the concept on confidence needs to be discussed. By definition, the confidence equals the probability that the terminal is actually located in the region that is determined and reported by the positioning method. In case of cell ID positioning, the polygon regions are large and a reasonable assumption is that the distributions of users is uniform across the polygon. On the contrary, for A-GPS the reported ellipsoidal uncertainty are related to a measurement error. In this case the UE is distributed according to a multi-dimensional normal distribution over the uncertainty region. The above two cases must not be confused, in the present invention the case with a uniform distribution over a large region is the valid case.

To proceed, the confidence value of the polygon is denoted $C_p$. The confidence value of the ellipse that is to be computed is denoted $C_e$. Since the distribution of users is assumed to be uniform, the following constraint holds for the areas of the polygon $A_P$, and the ellipse $A_e$:

$$A_e = \frac{C_e}{C_p} A_p. \quad (A12)$$

Since the area of an ellipse is:

$$A_e = \pi ab, \quad (A13)$$

it follows that:

$$ab = \frac{1}{\pi} \frac{C_e}{C_p} A_p. \quad (A14)$$

Equation (A14) provides a constraint that can be used in order to eliminate one of a or b from the optimization problem below, thereby reducing this problem to a one dimensional one. Note that $A_p$ is available from step 1 (A2).

The algorithm now calculates the semi-minor axis that provides the best fit according to the following criterion:

$$V(b) = \frac{1}{N_P} \sum_{i=1}^{N_P} ((y_i'')^2 - (y_e(b, x_i''))^2)^2. \quad (A15)$$

A number of comments are now in order.

The optimization is performed against the y-coordinate of the transformed polygon corner points, i.e. $y_i''$. The x-coordinate could be used instead. Alternatively, the optimization could be performed in a non-Cartesian co-ordinate system, e.g. a polar co-ordinate system.

The optimization can be extended to include also other points than corner points in the criterion, e.g. points taken on the boundary of the polygon. Note that all such points can be defined as corner points, by a division of the line segment on which the boundary point is located, into two pieces.

The square of the y-coordinates of the polygon and the ellipse model is used in the criterion. This avoids the need for separate treatment of the branches of the ellipse curve. In turn, an analytical solution can be obtained, as shown below.

The ellipse model $(y_e(b,x_i''))^2$ follows from the equation for the ellipse:

$$\frac{x^2}{a^2} + \frac{y^2}{b^2} = 1. \quad (A16)$$

When back-substituted in the criterion (A15), the optimization problem can be posed as:

$$\hat{b} = \sqrt{\operatorname*{argmin}_{b^2} \frac{1}{N_P} \sum_{i=1}^{N_P} \left( (y_i'')^2 - (b^2) - (b^2)^2 \frac{\pi^2 C_p^2}{C_e^2 A_p^2} (x_i'')^2 \right)^2}, \quad (A17)$$

after elimination of $\alpha$ using (A14).

A differentiation of the sum of squares, with respect to $b^2$, and rearranging renders the following cubic equation for $b^2$ from which $b^2$ can be solved:

$$\varepsilon_0 + \varepsilon_1 b^2 + \varepsilon_2 (b^2)^2 + \varepsilon_3 (b^2)^3 = 0 \quad (A18)$$

$$\varepsilon_0 = -\sum_{i=1}^{N_p} (y_i'')^2 \quad (A19)$$

$$\varepsilon_1 = \sum_{i=1}^{N_p} \left(1 + 2\frac{\pi^2 C_p^2}{C_e^2 A_p^2}(x_i'')^2 (y_i'')^2\right) \quad (A20)$$

$$\varepsilon_2 = -\sum_{i=1}^{N_p} 3\frac{\pi^2 C_p^2}{C_e^2 A_p^2}(x_i'')^2 \quad (A21)$$

$$\varepsilon_3 = \sum_{i=1}^{N_p} 2\frac{\pi^4 C_p^4}{C_e^4 A_p^4}(x_i'')^4. \quad (A22)$$

Note that a cubic equation can be solved analytically. In case there would be more than one positive solution to (A18), the one that renders the smallest value of the criterion function is taken as the solution. With b determined as the minimizing solution to (A18)-(A22), a can be computed from (A13) and (A14) as:

$$\hat{a} = \frac{1}{\pi}\frac{C_e}{C_p}A_p\frac{1}{\hat{b}}. \quad (A23)$$

All parameters that define the ellipse (a, b, $\alpha_e$) are now determined.

An extension to the above procedure, that improves the results, is described next. This extension modifies the confidence of the polygon according to:

$$C_p^{Scaled} = SC_p, \quad (A24)$$

where S is a scale factor, typically selected between 1.5 and 3. The effect is to secure that the area constraint does not force the ellipse to extend far outside the polygon during the optimization. Unless this is done, ellipse area is placed along the semi-major axis, outside of the polygon where there is no penalty of the criterion function that counteracts this tendency. After optimization, the semi-major and semi-minor axes are re-scaled according to:

$$\hat{a}^{Rescaled} = \sqrt{S}\hat{a} \quad (A25)$$

$$\hat{b}^{Rescaled} = \sqrt{S}\hat{b}. \quad (A26)$$

Figure 10:
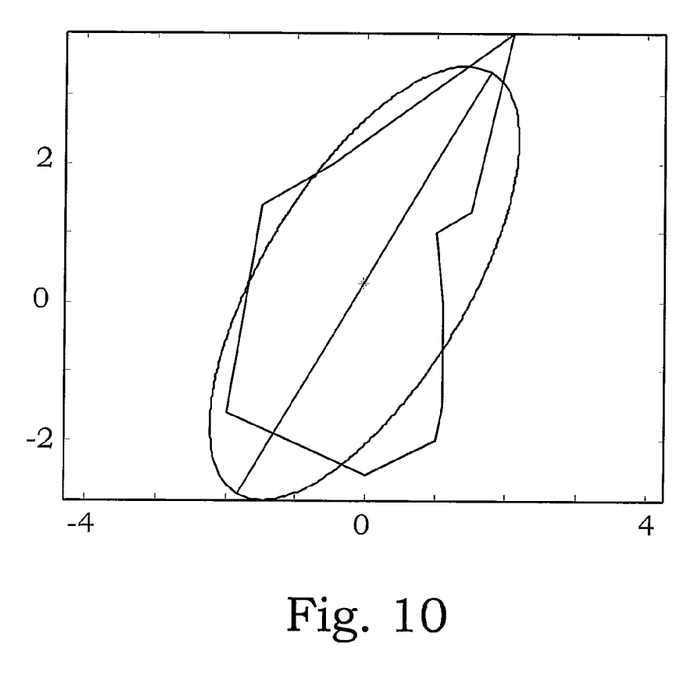
FIG. 10 illustrates the result of a polygon to ellipse shape conversion algorithm in 2 dimensions.

FIG. 10 shows an example of the ellipse obtained with the procedure above. The Parameters were selected as $C_p=0.8$, $C_e=0.95$, $S=2.0$.

The invention claimed is:

1. A method, by a position reporting node in a communication network, for reporting positioning data in the communication network, comprising:
obtaining positioning data comprising a definition of a polygon in a lateral plane with altitude information for each corner of the polygon and a confidence value;
approximating said polygon with an ellipsoid point that has an altitude, wherein said
approximating comprises
calculating a lateral center of gravity of said polygon as lateral parameters of said ellipsoid point; and
calculating a mean of said altitudes associated with said corners of the polygon as an altitude parameter of said ellipsoid point;
further approximating said polygon with an uncertainty ellipsoid that surrounds said ellipsoid point, wherein said approximating comprises calculating an uncertainty ellipse around the ellipsoid point;
transforming the uncertainty ellipse into a corresponding uncertainty ellipsoid, defined by semi-principal axes a, b, and c, by calculating a covariance in the vertical direction;
obtaining a scaling factor corresponding to the confidence value based on a Gaussian assumption of the confidence value associated with the polygon with altitude; and
scaling the three semi-principal axes a, b, and c of the uncertainty ellipsoid with the scaling factor; and
reporting said lateral parameters and altitude parameter of said ellipsoid point, and reporting said scaled uncertainty ellipsoid, over an interface of said communication network, as a representation of said positioning data.

2. The method according to claim 1, wherein said approximating further comprises searching for a direction of a longest line segment that passes through said center of gravity and that has end points on a boundary of said polygon, and selecting said direction as an orientation of a major axis of said uncertainty ellipsoid.

3. The method according to claim 1, wherein obtaining the scaling factor comprises, for the confidence value, calculating the scaling factor based on the Gaussian assumption.

4. The method according to claim 3, wherein obtaining the scaling factor comprises retrieving the scaling factor from a look-up table indexed by the confidence value, the table populated based on the Gaussian assumption.

5. A node in a communication network, comprising:
a report converter configured to:
obtain positioning data comprising a definition of a polygon in a lateral plane with altitude information for each corner of the polygon and a confidence value; and
approximate said polygon with an ellipsoid point that has an altitude by calculating a lateral center of gravity of said polygon as lateral parameters of said ellipsoid point; and
calculating a mean of said altitudes associated with said polygon corners as an altitude parameter of said ellipsoid point; and
further approximate said polygon with an uncertainty ellipsoid that surrounds said ellipsoid point by
calculating an uncertainty ellipse around the ellipsoid point;
transforming the uncertainty ellipse into a corresponding uncertainty ellipsoid, defined by semi-principal axes a, b, and c, by calculating a covariance in the vertical direction;
obtaining a scaling factor corresponding to the confidence value based on a Gaussian assumption of the confidence value associated with the polygon with altitude; and
scaling the three semi-principal axes a, b, and c of the uncertainty ellipsoid with the scaling factor; and
a report unit that is connected to said report converter and an interface of said communication network, and that is configured to report said lateral parameters and altitude parameter of said ellipsoid point, and to report said uncertainty ellipsoid, over said interface as a representation of said positioning data.

6. The node according to claim 5, further comprising a positioning unit connected to said report converter and configured to create said positioning data.

7. The node according to claim 5, further comprising a receiver connected to said report converter and configured to receive said positioning data from an external positioning node.

8. The node according to claim 5, wherein the report converter is configured to approximate said polygon by searching for a direction of a longest line segment that passes through said center of gravity and that has end points on a boundary of said polygon, and selecting said direction as an orientation of a major axis of said uncertainty ellipsoid.

9. The node according to claim 5, wherein the report converter is configured to obtain the scaling factor by, for the confidence value, calculating the scaling factor based on the Gaussian assumption.

10. The node according to claim 5, wherein the report converter is configured to obtain the scaling factor by retrieving the scaling factor from a look-up table indexed by the confidence value, the table populated based on the Gaussian assumption.

11. The method according to claim 1 wherein the covariance of the uncertainty ellipsoid in the vertical direction is calculated according to the equation:

$$c^2 = \sum_{i=1}^{N_p} (z_i - z_{CG})^2$$

where
c is the vertical axis of the uncertainty ellipsoid;
$N_p$ is the number of corners of the polygon with altitude;
$z_j$ is the altitude of the i-th polygon corner; and
$z_{cs}$ is the altitude of the ellipsoid point with altitude.

12. The method according to claim 1 wherein the Gaussian assumption of the confidence value is expressed as:

$$C_{3D} = \iiint\limits_{(\frac{x}{\gamma a})^2+(\frac{x}{\gamma b})^2+(\frac{x}{\gamma c})^2 \leq 1} \frac{1}{2\pi^{1.5}abc} e^{-\frac{1}{2}((\frac{x}{a})^2+(\frac{x}{b})^2+(\frac{x}{c})^2)} dxdydz = \operatorname{erf}\left(\frac{\gamma}{2}\right) - \sqrt{\frac{2}{\pi}} \gamma\, e^{-\frac{\gamma^2}{2}}$$

where
$C_{3D}$ is the 3-D confidence value;
γ is the scaling factor; and
a, b, and c are the semi-principal axes of the uncertainty ellipsoid.

13. The method according to claim 1 wherein scaling the three semi-principal axes a, b, and c of the uncertainty ellipsoid with the scaling factor comprises scaling each of the three semi-principal axes of the uncertainty ellipsoid according to:

$a_{Scaled} = \gamma a$
$b_{Scaled} = \gamma b$
$c_{Scaled} = \gamma c$ where
γ is the scaling factor;
a, b, and c are the semi-principal axes of the unsealed uncertainty ellipsoid; and
$a_{scaled}$, $b_{scaled}$ and $c_{scaled}$ are the semi-principal axes of the scaled uncertain ellipsoid.

14. The node according to claim 5 wherein the report converter is configured to calculate the covariance of the uncertainty ellipsoid in the vertical direction according to the equation:

$$c^2 = \sum_{i=1}^{N_p} (z_i - z_{CG})^2$$

where
c is the vertical axis of the uncertainty ellipsoid;
$N_p$ is the number of corners of the polygon with altitude;
$Z_j$ is the altitude of the i-th polygon corner; and
$Z_{cs}$ is the altitude of the ellipsoid point with altitude.

15. The node according to claim 5 wherein the Gaussian assumption of the confidence value is expressed as:

$$C_{3D} = \iiint\limits_{(\frac{x}{\gamma a})^2+(\frac{x}{\gamma b})^2+(\frac{x}{\gamma c})^2 \leq 1} \frac{1}{2\pi^{1.5}abc} e^{-\frac{1}{2}((\frac{x}{a})^2+(\frac{x}{b})^2+(\frac{x}{c})^2)} dxdydz = \operatorname{erf}\left(\frac{\gamma}{2}\right) - \sqrt{\frac{2}{\pi}} \gamma\, e^{-\frac{\gamma^2}{2}}$$

where
$C_{3D}$ is the 3-D confidence value;
γ is the scaling factor; and
a, b, and c are the semi-principal axes of the uncertainty ellipsoid.

16. The node according to claim 5 wherein the report converter is configured to scale the three semi-principal axes a, b, and c of the uncertainty ellipsoid with the scaling factor by scaling each of the three semi-principal axes of the uncertainty ellipsoid according to:

$a_{Scaled} = \gamma a$
$b_{Scaled} = \gamma b$
$c_{Scaled} = \gamma c$ where
γ is the scaling factor;
a, b, and c are the semi-principal axes of the unscaled uncertainty ellipsoid; and
$a_{Scaled}$, $b_{Scaled}$, and $c_{Scaled}$ are the semi-principal axes of the scaled uncertainty ellipsoid.

* * * * *